US011216662B2

(12) United States Patent
Kopansky et al.

(10) Patent No.: US 11,216,662 B2
(45) Date of Patent: Jan. 4, 2022

(54) EFFICIENT TRANSMISSION OF VIDEO OVER LOW BANDWIDTH CHANNELS

(71) Applicant: SRI INTERNATIONAL, Menlo Park, CA (US)

(72) Inventors: Arkady Kopansky, Feasterville, PA (US); Michael Kiernan, Jenkintown, PA (US); Peter Demers, Hopewell, NJ (US)

(73) Assignee: SRI International, Menlo Park, CA (US)

( * ) Notice: Subject to any disclaimer, the term of this patent is extended or adjusted under 35 U.S.C. 154(b) by 95 days.

(21) Appl. No.: 16/834,710

(22) Filed: Mar. 30, 2020

(65) Prior Publication Data

US 2020/0320272 A1   Oct. 8, 2020

Related U.S. Application Data

(60) Provisional application No. 62/829,456, filed on Apr. 4, 2019.

(51) Int. Cl.
*H04N 19/44* (2014.01)
*G06K 9/46* (2006.01)
*G06K 9/00* (2006.01)

(52) U.S. Cl.
CPC ....... *G06K 9/0063* (2013.01); *G06K 9/00201* (2013.01); *G06K 9/4652* (2013.01); *H04N 19/44* (2014.11)

(58) Field of Classification Search
None
See application file for complete search history.

(56) References Cited

U.S. PATENT DOCUMENTS

| 6,490,319 | B1 | 12/2002 | Yang |
| 9,036,693 | B2 | 5/2015 | Isnardi et al. |

(Continued)

FOREIGN PATENT DOCUMENTS

WO   2005004062 A2   1/2005

OTHER PUBLICATIONS

Gopalan, Ramya. Exploiting Region of Interest for Improved Video Coding. Diss. The Ohio State University, 2009.
(Continued)

*Primary Examiner* — Idowu O Osifade
(74) *Attorney, Agent, or Firm* — McDonnell Boehnen Hulbert & Berghoff LLP

(57) ABSTRACT

A variety of applications involve transmission of video data in real time. However, bandwidth limitations may result in degradation of the quality of the transmitted video. To address such limitations, a video stream may be limited to 'regions of interest' within each frame of the video stream. This can be accomplished by setting areas outside of the regions of interest to an a priori known color or 'blanking' color, and the resulting 'blanked' video stream can be compressed and transmitted without extensive modifications to existing transmission apparatus. The original video can be reconstituted by superimposing the received region-of-interest video data onto a background image of the environment that contains the regions-of-interest. The background image can be satellite imagery or other stored imagery that matches the perspective of the video stream. Geographical tag data can be used to superimpose the region-of-interest video data onto the background image.

20 Claims, 4 Drawing Sheets

(56) References Cited

U.S. PATENT DOCUMENTS

| | | | | |
|---|---|---|---|---|
| 2002/0176001 | A1* | 11/2002 | Trajkovic | G06K 9/4652 348/169 |
| 2011/0235706 | A1 | 9/2011 | Demircin et al. | |
| 2018/0259960 | A1* | 9/2018 | Cuban | H04N 5/232 |

OTHER PUBLICATIONS

Meuel, Holger, Florian Kluger, and Jörn Ostermann. "Region of Interest (ROI) Coding for Aerial Surveillance Video using AVC & HEVC." arXiv preprint arXiv:1801.06442 (2018).

Soyak, Eren, Sotirios A. Tsaftaris, and Aggelos K. Katsaggelos. "Content-aware H. 264 encoding for traffic video tracking applications." 2010 IEEE International Conference on Acoustics, Speech and Signal Processing. IEEE, 2010.

Zingirian, Nicola, et al. "Customizing MPEG video compression algorithms to specific application domains: The case of highway monitoring." International Conference on Image Analysis and Processing. Springer, Bedin, Heidelberg, 1997.

Grois, Dan, and Ofer Hadar. "Recent advances in region-of-interest video coding." Recent Advances on Video Coding. IntechOpen, 2011.

Grois, Dan, and Ofer Hadar. "Efficient region-of-interest scalable video coding with adaptive bit-rate control." Advances in Multimedia 2013 (2013).

Ren, Xiang, et al. "An Augmented Reality Geo-Registration Method for Ground Target Localization from a Low-Cost UAV Platform." Sensors 18.11 (2018): 3739.

Produit, Ahmed Samy Nassar. "Towards seamless multi-view scene analysis from satellite to street-level" arXiv preprint arXiv:1705.08101 (2017).

"Motion Video Exploitation," by Robert Mott, posted Oct. 12, 2011.

\* cited by examiner

EFFICIENT TRANSMISSION OF VIDEO OVER LOW BANDWIDTH CHANNELS

CROSS-REFERENCE TO RELATED APPLICATION

This application claims priority to U.S. Provisional Patent Application No. 62/829,456, filed Apr. 4, 2019, which is incorporated herein by reference.

BACKGROUND

Unless otherwise indicated herein, the materials described in this section are not prior art to the claims in this application and are not admitted to be prior art by inclusion in this section.

It is beneficial in a variety of applications to stream video from a source (e.g., a camera of an unmanned aerial vehicle (UAV)) to a destination where the video will be used (e.g., a control station being used to control the source UAV or a command station that is organizing a military, police, emergency response, or humanitarian effort based on information including the streamed video). However, the bandwidth available for such video streaming may be limited due to hardware limitations of the transmitter/receiver (e.g., size and power limitations of a transmitter of a UAV), limited local infrastructure (e.g., a battlefield, an area experiencing a natural disaster such that infrastructure is disabled and/or overwhelmed), or other factors. Accordingly, the resolution, frame rate, quality, or other properties of the video stream may be limited. These limitations may be partially alleviated by employing video compression to improve the video frame rate, resolution, and/or quality within a bandwidth constraint.

SUMMARY

Some embodiments of the present disclosure provide a method that includes: (i) receiving an input video stream, wherein the input video stream represents a sequence of input image frames, and wherein a particular one of the input image frames contains at least one image region that (1) is surrounded by an a priori known color and (2) corresponds to a target region; (ii) obtaining location data for the input video stream; (iii) obtaining a background image for the target region; (iv) based on the location data, generating an output video stream by combining the input video stream with the background image, wherein the output video stream represents a sequence of output image frames, and wherein a particular one of the output image frames that corresponds to the particular one of the input image frames represents the at least one image region superimposed on the background image.

Some embodiments of the present disclosure provide a non-transitory computer readable medium having stored thereon instructions executable by one or more processors to cause a computing system to perform functions corresponding to the above method.

Some embodiments of the present disclosure provide a system that includes: (i) one or more processors; and (ii) a non-transitory computer readable medium having stored thereon instructions executable by the one or more processors to perform functions corresponding to the above method.

These as well as other aspects, advantages, and alternatives, will become apparent to those of ordinary skill in the art by reading the following detailed description, with reference where appropriate to the accompanying drawings.

DETAILED DESCRIPTION

Figure 1:
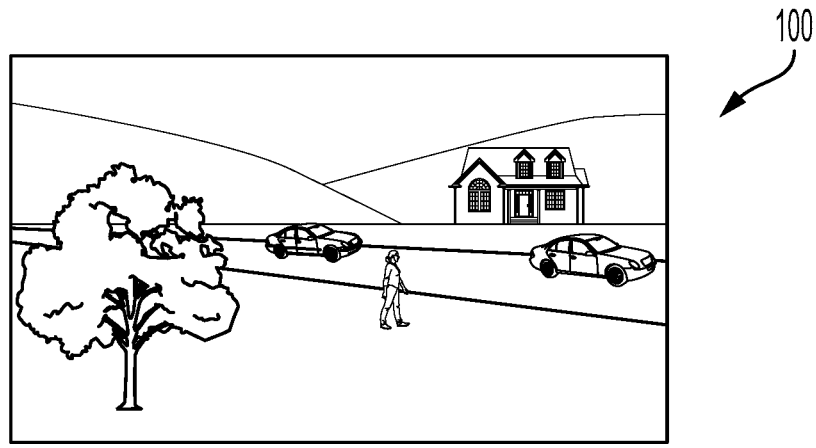
FIG. 1 is an image from a video stream, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Users of video captured from sources with geographical information (e.g., UAVs), including users with very limited bandwidth, often desire both the video and the associated geographical information to be widely available in real time or near real time, at full resolution and full frame rate.

Currently, users on severely bandwidth limited links typically receive either geographical only information or geographical information with low resolution and low frame rate video in real time. As a result, current technology can support either non-real-time transmission of full-resolution, full frame rate video with geographical information, or significantly degraded quality (typically in both resolution and frame rate) video.

The disclosed approach addresses this limitation of the current typical approaches by combining transmission of full geographical information, which requires low bandwidth, with region-of-interest video compression, which also requires much lower bandwidth than traditional approaches. Thus, this approach enables real-time or near real-time transmission of full resolution and frame rate of objects of interest with precise geographical coordinates.

Some of the embodiments described herein include sending geographical coordinates for the original frame size and up to original frame rate combined with a region of interest video compression approach. Some of the embodiments described herein include creating composite video frames using the geo-located foreground objects overlaid over map imagery from an available terrain database, resulting in re-creation of naturally looking full resolution, full frame rate video where the objects of interest are shown moving over the terrain at their original resolution, frame rate, and current geographical location.

Some of the embodiments described herein allow for transmission of geo-located objects of interest at full resolution and frame rate over very low bandwidth channels while synthesizing naturally looking full resolution, full frame rate video.

One of the advantages of the disclosed embodiments is that they are applicable to commercial off the shelf (COTS) parts and fully compatible with the industry standards. As a result, the potential risk to the adopters is low. Adopters using this implementation of the technology may see the highest quality video when used with complementary technology described in U.S. Pat. No. 9,036,693 having the title, "Method and system for providing region-of-interest video compression" and 9,210,444 having the title, "Method and apparatus for vision and network guided prefiltering", (both of which are incorporated herein in their entirety by reference) and the most precise associated geographical coordinates for the objects of interest, but the approaches described herein are also compatible with third party solutions.

Described herein are methods for efficiently sending geographical coordinates of objects in video transmitted over low bandwidth channels. Precise geographical coordinates for full resolution video frames are assumed to be available. The full resolution video frames are analyzed, and the objects of interest are identified as foreground and the rest of the video content may be considered to be background. Some or all of the pixels in the background can then be replaced by a fixed known value selected for ease of encoding by the conventional video encoders. Video frames to be transmitted are synthesized by overlaying the objects over the modified background and then encoded at original size and frame rate. Both the compressed video and the geographical coordinates for each such frame may be transmitted. Because typically only a small number of pixels from the original frames contain relevant video data, the resulting encoded video is produced at much lower bit rate than the bit rate that would have resulted from encoding the original video. Furthermore, because the precise geographical information is transmitted for the full-size frame, geographical coordinates for all pixels, including the foreground objects, are available at the receiver.

II. Example Transmission and Recovery of Video Data

As noted above, there are many applications in which it is desirable to transmit real-time video but the bandwidth available for transmission is limited. This could be related to limitations on the transmitter and/or receiver hardware. For example, the transmitter could be located on a UAV or other remote controlled device and so may be limited with respect to size, complexity, and/or power budget. Additionally or alternatively, the environment and/or infrastructure may be insufficient to facilitate higher-bandwidth links. For example, the transmitter could be located above a battlefield, at a high elevation, or in some other environment wherein cellular, fiber-optic, or other high-bandwidth wired or wireless links are not available such that satellite links, line-of-sight radio links, or other limited-bandwidth communications links are used. Yet further, natural or artificial conditions (e.g., flooding or other natural disasters, military action) may be such that existing infrastructure is damaged, depowered, jammed, or otherwise impeded from providing higher-bandwidth communications. The effects of limited bandwidth can be partially ameliorated by applying compression to a video stream prior to transmission over the limited-bandwidth channel. However, the frame rate, resolution, and/or quality of the video stream may still be limited to undesired levels by certain low-bandwidth communications channels.

The resolution, frame rate, and/or quality of a transmitted video stream could be improved by only transmitting information about one or more 'regions of interest' (ROIs) within the video stream. For example, such a region of interest could be a region that contains a moving vehicle, person, or other object of interest (e.g., a person stranded at sea being rescued by a helicopter with the aid of a spotting UAV, or a vehicle being driven by a suspect who is being pursued with the aid of a police UAV). However, selective transmission of such regions within a video frame may have several drawbacks. First, selective transmission of sub-sections of a video frame may require the modification of the encoding, transmission, reception, decoding, and/or display hardware and/or software used to effect transmission of the video stream. This can be costly in terms of hardware (especially in applications requiring conformity with strict military or other operational standards) and in terms of the logistical difficultly of making certain that equipment at both the video generation site (e.g., UAV) and video reception site (e.g., an emergency response command center or mobile command post) are compatible. Second, viewing a region of interest without the remainder of the video frame may make it difficult to determine the context of the region of interest. For example, it could be difficult or impossible to understand, at a glance, the location of a person, vehicle, or other content of a transmitted region of interest relative to buildings, terrain, or other elements of an environment. The embodiments described herein alleviate these problems.

In an example embodiment, one or more regions of interest within a video stream are identified and then non-region-of-interest areas (e.g., pixels) of image frames of the video stream are set to an a priori known 'background' color (e.g., grey). This 'blanked' video stream can then be compressed and sent over a limited-bandwidth channel. Because the 'blanked' areas of the image frame are now very low-information relative to the non-blanked region(s) of interest, the majority of the bandwidth can be allocated, during compression, to represent the region(s) of interest within the frame. This compression (and corresponding decompression) can be performed with existing, off-the-shelf compression hardware and/or software, reducing costs and complexity while increasing reliability by allowing known reliable hardware/software to be used for the compression and/or decompression of video streams that have had non-regions-of-interest blanked in this manner.

The partially-blanked video stream can then be superimposed on a background image that represents the target of the video stream in order to provide environmental and location context (e.g., the identity, relative location and size, etc. of buildings, terrain, or objects in the environment of the contents of the regions of interest). The background image could be selected/generated, and the region(s) of interest superimposed thereon, based on high-quality location data about the video stream (e.g., the location and orientation of a camera being used to generate the video stream, the location of corner pixels of the video stream, the location of corner pixels of the region(s) of interest). Such a background image could be selected and/or generated from a database containing images of potential environments of interest, e.g., a database of satellite imagery. A candidate background image could be distorted, mapped to a topographic terrain model, or otherwise modified, based on the location data for the video stream, to provide a background image onto which the region(s) of interest from the video stream can be superimposed. Such an image can be updated over time to compensate for changes in perspective of the video stream (e.g., by adapting the direction and amount of distortion applied to a satellite image), to provide updated background image information (e.g., where the background image is provided, at a lower frame rate, by the same camera used to generate the video stream), or to provide some other benefit.

FIG. 1 illustrates an example image frame 100 of an example video stream (which comprises a plurality of such video frames). As shown, the image frame 100 represents a variety of contents of a target region that is being imaged (e.g., by an emergency-response UAV). The contents include terrain (e.g., a road, hills), a tree, a building, several cars (one parked in front of the building and two in motion along the road), and a person walking along the side of the road. The video stream can be captured by a camera or other imaging apparatus of a UAV or other system that is in wired or wireless communications with a receiver.

Figure 2:
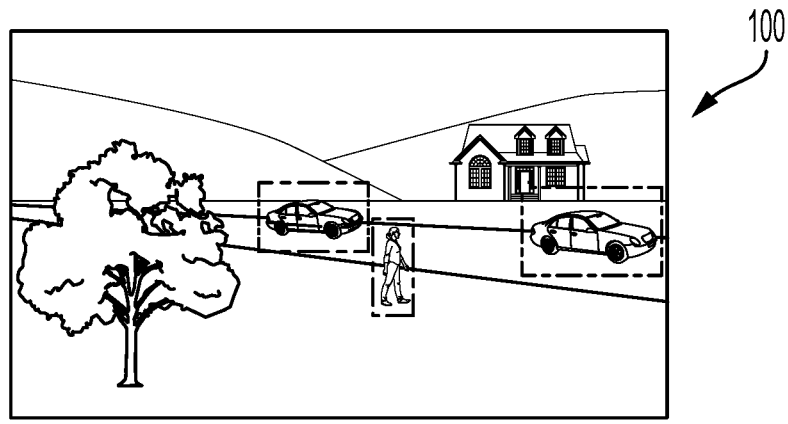
FIG. 2 is the image of FIG. 1 with identified regions of interest indicated, according to example embodiments.

FIG. 2 illustrates the image frame 100 with several regions of interest indicated by dashed lines. The regions of interest encompass the two moving cars and the walking person. These regions of interest could be identified using a variety of methods or algorithms. For example, a trained neural network could receive the video stream and/or individual image frames thereof and output the locations, extents, or other information defining one or more regions of interest. Additionally or alternatively, an algorithm could be applied to detect regions of relative motion within the video stream (e.g., regions that are in motion after accounting for overall motion of contents within the video stream due to changes in the location and/or orientation of a camera that is generating the video stream). The regions of interest could then be determined based on the identified regions of relative motion (e.g., by drawing bounding boxes around regions of relative motion that have supra-threshold areas). Other methods of region of interest detection could be applied to identify regions of interest within a video stream.

Figure 3:
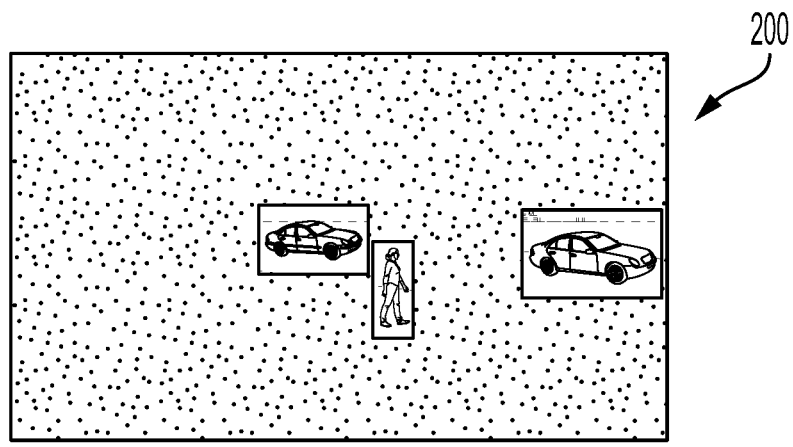
FIG. 3 is an image from a video stream generated based on the video stream of FIG. 1 and the identified regions of interest of FIG. 2, according to example embodiments.

Once one or more regions of interest have been identified within a video stream (e.g., within a particular image frame of the video stream), areas (e.g., pixels) of image frames of the video stream that are not within the region(s) of interest can be set to a pre-specified, a priori known background color, e.g., to a specified grey hue. FIG. 3 shows an image frame 200 that has been generated by applying such a blanking procedure to the image frame 100 using the regions of interest illustrated in FIG. 2. In some examples, the extent of the regions of interest, within the image frame(s), may be determined and/or modified to comport with block boundaries of a subsequent compression step. This could be done to improve the subsequent compression step, e.g., by increasing a number of image blocks that are entirely filled by the a priori known background color.

Setting the non-region-of-interest areas of image frames to the a priori known background color (a process that may be referred to as "blanking") could be effected in a variety of ways. In examples wherein the video stream is a digital video stream, this process could be performed digitally, by setting the digital value of the appropriate pixels to a value representative of the a priori known background color. In examples wherein the video stream is an analog video stream (e.g., a set of red, green, and blue analog signals, a set of Y, U, and V analog signals, or some other analog video signal), the blanking process could be effected by operating switches to switch between an upstream analog video signal source and a constant signal representative of the a priori known background color. Such switches could be operated based on timing signals that represent the extent of the region(s) of interest within the video stream.

This blanked video stream can then be compressed and then transmitted via a wired or wireless communication link (e.g., via a satellite communications link, via a line-of-sight radio frequency communications link) to a receiving station. The transmitted signal can then be decompressed to restore the blanked image frames of the video stream (e.g., as depicted in FIG. 3). However, this blanked video signal lacks the context information that was provided by the non-region-of-interest portions of the video stream (e.g., information about the presence, relative location and size, or other information about buildings, terrain, or other contents of the environment of the contents of the region(s) of interest). To provide this information to a viewer of the video stream, location information for the video stream and/or for the region(s) of interest can be used to select and/or generate background image information on which the region(s) of interest can be superimposed.

This location information can be generated by a system that also generated the video stream and can be transmitted along with the video stream (e.g., as part of an MPEG-2 transport stream that includes the video stream). For example, the US Motion Imagery Standards Board (MISB) publishes standards for carriage of synchronous and asynchronous carriage of KLV (key-length-value) metadata with the video data. The location data can include GPS coordinates, latitude/longitude data, camera orientation data, camera velocity/rotation data, magnetometer data, or other information generated based on the outputs of one or more GPS receivers, magnetometers, inertial measurement units, accelerometers, gyroscopes, radio frequency positioning systems, image-guided navigation systems, or other systems or sensors configured to generate location-related data. The location information could represent the location, orientation, translational velocity, rotational velocity, and/or other information about the location and/or motion of a camera that is generating the video stream. Additionally or alternatively, the location information could represent the location (e.g., latitude/longitude, a ray in space) of pixels in the video stream, e.g., the four corner pixels of the video stream, a center, corner, or other representative pixel of the video stream, the four corner pixels of region(s) of interest within the video stream, a center, corner, or other representative pixel of region(s) of interest within the video stream.

Figure 4:
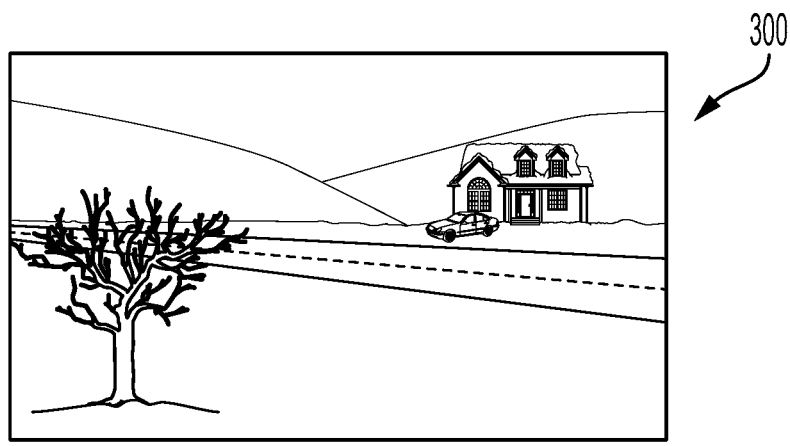
FIG. 4 is a background image, according to example embodiments.

As noted above, the location information associated with each frame in the video stream can be used to obtain (e.g., select, generate, etc.) a background image onto which the region(s) of interest of the video stream can be superimposed. Such a background image could represent the historical appearance of a target region that is represented in the region(s) of interest of the video stream. Such a background image 300 is depicted in FIG. 4. The background image could be generated based on an appropriate image from a database of satellite images or other relevant images of potential environments of interest. For example, the location information could be used to select one or more relevant images from such an image database to generate the background image (e.g., image(s) that overlap a target region represented by the location information). The satellite image(s) (or other stored image(s)) thus selected could then be modified, based on the location data, such that the apparent perspective of the modified background image matches the perspective represented by the region(s) of interest in the video stream (e.g., the perspective of the camera used to originally generate the source of the video stream). This could include scaling, rotating, cropping, keystoning, or otherwise modifying one or more images. Additionally or alternatively, the image information from one or more stored images could be projected onto a topographic model of the target region, and the background image could be generated by simulating a view of the image data projected onto the topographic model from the perspective represented by the location data.

Additionally or alternatively, the background image could be generated by the same system (e.g., using the same camera) that generated the video stream. For example, a UAV could generate and transmit a complete image of a target region prior to transmitting a real-time video stream that has been blanked as described herein. This could be done so as to provide contextual image information while not exceeding the limited bandwidth of a communication link by, e.g., only providing the full background image once, or at a very low rate of repetition. This could include reserving a small portion of the communication link bandwidth for transmission of such non-blanked background images at a low rate (e.g., a few times per minute or less often) with the remainder of the link bandwidth used to transmit a real-time, relatively higher frame rate (e.g., 24 frames per second or higher) video stream that has been blanked so as to only include image information for one or more regions of interest within the frame of the video stream.

Figure 5:
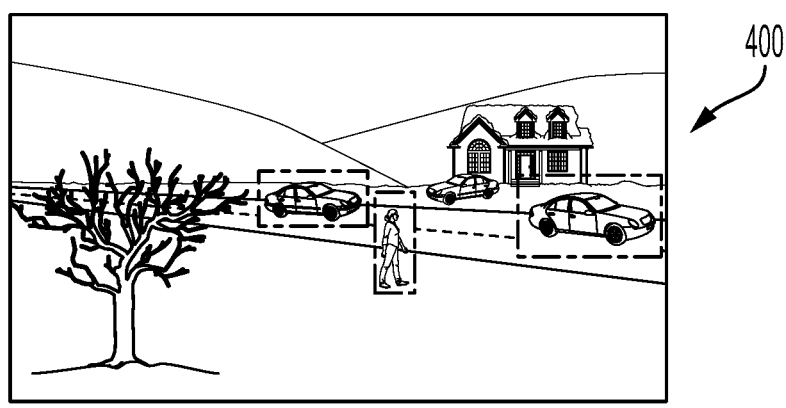
FIG. 5 is a composite image, according to example embodiments.

The blanked input video stream can be combined with the background image to create an output video stream. This combination could be performed in a variety of ways such that a particular image frame, of the output video stream, that corresponds to one of the image frames of the received input video stream represents at least one image region of interest of the input image frame superimposed on the background image. An example of such an output image frame 400 is illustrated in FIG. 5, which shows the regions of interest illustrated in FIG. 2 (shown in dashed lines in FIG. 5) combined with the background image 300 of FIG. 4.

This combination could be performed in a variety of ways. In some examples, the region(s) of interest could be extracted from the image frames of the video stream (e.g., by copying the information of the pixels of the region(s) of interest). The extracted image information can then be overlaid onto or otherwise combined with the background image. The extent of the region(s) of interest could be determined from the input image frames, e.g., by performing edge detection of the boundaries between the a priori known color and other colors within the input image frames. Additionally or alternatively, information about the extent of the region(s) of interest (e.g., an index of one or more corner pixels of the region(s) of interest) could be provided with the video stream (e.g., as part of an MPEG-2 transport stream that includes the video stream). Additionally or alternatively, the region(s) of interest within a particular input image frame could be combined with a background image by superimposing the particular input image frame onto the background image, treating pixels or other areas of the particular input image frame that are the a priori known color as transparent.

Combining the input image frames with background image(s) could be performed in a digital or analog manner. For example, where the video stream is an analog video stream (e.g., a set of red, green, and blue analog signals, a set of Y, U, and V analog signals, or some other analog video signal), the combining process could be effected by operating switches to switch between a first analog video signal source that is providing the input image frame and a second analog signal source that is providing the background image. Such switches could be operated based on timing signals that represent the extent of the region(s) of interest within the video stream. Additionally or alternatively, such switches could be operated based on the color represented in the first analog video signal.

Note that while some of the above examples include obtaining a single background image and applying it to image frames of a video stream, it is possible to obtain a plurality of different background images and to apply them to respective image frames or sets of image frames of a video stream. For example, a single satellite image could be modified for each input image frame of a video stream, based on updated location information over time for each of the input image frames, and the modified satellite images combined with their corresponding input image frames. In another example, the background image (and/or an underlying source image used to generate the background image) could be updated over time, as updated background imagery becomes available. This could occur due to a satellite overpass making updated terrain imagery available. Alternatively, the same system (e.g., UAV) that is providing the partially-blanked video stream at a higher frame rate (e.g., at 24 or more frames per second) could also provide non-blanked images at a lower rate (e.g., less than a 6 per minute) and the most recently-received of these non-blanked images could be combined with region of interest image information from image frames of the higher-frame-rate partially-blanked video stream.

III. Example Systems

Figure 6:
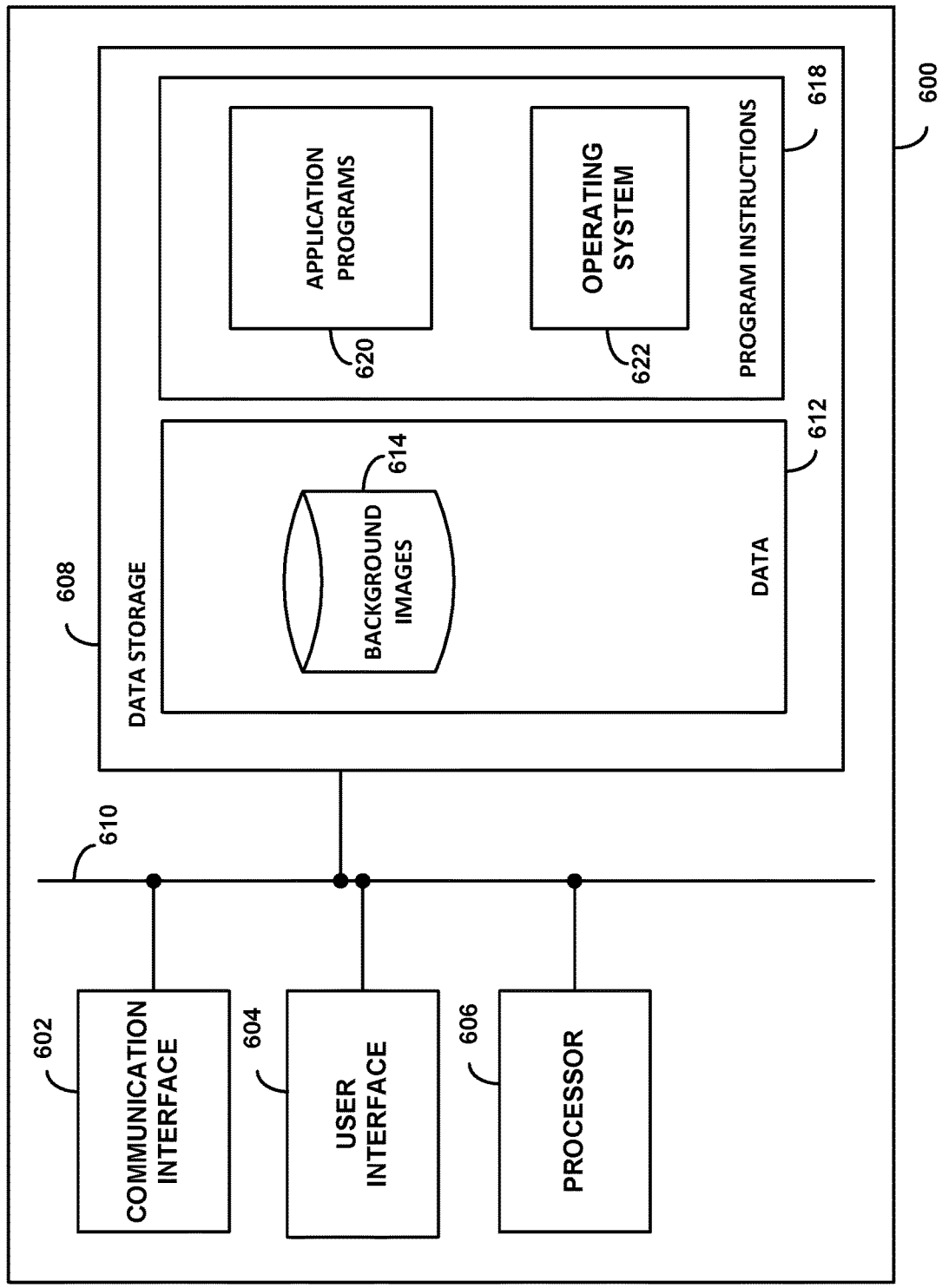
FIG. 6 is an example system.

FIG. 6 illustrates an example computing device 600 that may be used to implement the methods described herein. By way of example and without limitation, computing device 600 may be a display device of a mobile command center, a computer (such as a desktop, notebook, tablet, or handheld computer), a personal digital assistant (PDA), a cellular telephone, a satellite phone, a digital television, a wearable computing device, or some other type of device. Such a device may be equipped with an image display device so as to display one or more combined images generated according to the methods described herein. Additionally or alternatively, such a device may include a communications interface and may be programmed or otherwise configured to transmit indications of such combined images to some other device or system (e.g., the device could be an image processor configured to be inserted into an existing image reception, processing, dissemination, and/or display system). It should be understood that computing device 600 may represent a physical display device such as a ruggedized video communications terminal, a particular physical hardware platform on which an image processing application operates in software, or other combinations of hardware and software that are configured to carry out image processing and/or communication functions.

As shown in FIG. 6, computing device 600 may include a communication interface 602, a user interface 604, a processor 606, and data storage 608, all of which may be communicatively linked together by a system bus, network, or other connection mechanism 610.

Communication interface 602 may function to allow computing device 600 to communicate, using analog or digital modulation of electric, magnetic, electromagnetic, optical, or other signals, with other devices, access networks, and/or transport networks. Thus, communication interface 602 may facilitate circuit-switched and/or packet-switched communication, such as plain old telephone service (POTS) communication and/or Internet protocol (IP) or other packetized communication. For instance, communication interface 602 may include a chipset and antenna arranged for wireless communication with a radio access network or an access point. Also, communication interface 602 may take the form of or include a wireline interface, such as an Ethernet, Universal Serial Bus (USB), or High-Definition Multimedia Interface (HDMI) port. Communication interface 602 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 602. Furthermore, communication interface 602 may comprise multiple physical communication interfaces (e.g., a Wifi interface, a BLUETOOTH® interface, and a wide-area wireless interface).

In some embodiments, communication interface 602 may function to allow computing device 600 to communicate with other devices, remote servers, access networks, and/or transport networks. For example, the communication interface 602 may function to receive a video stream that may include image frames that have been partially blanked as described herein. The communication interface 602 may function to access a database of satellite images or other image information about a target region via communication with a remote server or other remote device or system. The communication interface 602 may function to transmit an output video stream that includes one or more background images combined with region-of-interest image information from image frames of an input video stream (which may have been received via the communication interface 602).

User interface 604 may function to allow computing device 600 to interact with a user, for example to receive input from and/or to provide output to the user. Thus, user interface 604 may include input components such as a keypad, keyboard, touch-sensitive or presence-sensitive panel, computer mouse, trackball, joystick, microphone, and so on. User interface 604 may also include one or more output components such as a display screen which, for example, may be combined with a presence-sensitive panel. The display screen may be based on CRT, LCD, and/or LED technologies, or other technologies now known or later developed. User interface 604 may also be configured to generate audible output(s), via a speaker, speaker jack, audio output port, audio output device, earphones, and/or other similar devices.

Processor 606 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing, image alignment, image decoding/encoding, and combining images, among other applications or functions. Data storage 608 may include one or more volatile and/or non-volatile storage components, such as magnetic, optical, flash, or organic storage, and may be integrated in whole or in part with processor 606. Data storage 608 may include removable and/or non-removable components.

Processor 606 may be capable of executing program instructions 618 (e.g., compiled or non-compiled program logic and/or machine code) stored in data storage 608 to carry out the various functions described herein. Therefore, data storage 608 may include a non-transitory computer-readable medium, having stored thereon program instructions that, upon execution by computing device 600, cause computing device 600 to carry out any of the methods, processes, or functions disclosed in this specification and/or the accompanying drawings. The execution of program instructions 618 by processor 606 may result in processor 606 using data 612.

By way of example, program instructions 618 may include an operating system 622 (e.g., an operating system kernel, device driver(s), and/or other modules) and one or more application programs 620 (e.g., camera functions, encoder and/or ANN training, image-based color palette generation, image-based dithering image, or other error spreading information generation) installed on computing device 600. Data 612 may include a set of background images 614. Background images 614 may be combined with image frames of an input video stream as described herein. Background images 614 may be satellite images, or may be images received from the same system(s) from which a video stream is received.

Application programs 620 may communicate with operating system 622 through one or more application programming interfaces (APIs). These APIs may facilitate, for instance, transmitting or receiving information via communication interface 602, displaying information (e.g., combined video streams) on user interface 604, receiving video streams, and so on.

Application programs 620 may take the form of "apps" that could be downloadable to computing device 600 through one or more online application stores or application markets (via, e.g., the communication interface 602). However, application programs can also be installed on computing device 600 in other ways, such as via a web browser or through a physical interface (e.g., a USB port) of the computing device 600.

The computing device 600 may implement the methods described herein via digital methods (e.g., by executing program instructions to perform the methods described herein on digital video streams), via analog methods (e.g., by operating analog switches to select whether to output a portion of an analog signal representing an input image frame or an analog signal representing a background image), or via some combination of analog and digital methods. The computing device 600 may implement the methods described herein in a manner that is compatible with existing video equipment and existing video processing and communications flows. For example, the computing device 600 may include standardized hardware and/or software interfaces to permit the computing device 600 to be easily interposed between a video stream source (e.g., a camera) and a video encoder (e.g., an analog or digital video compression unit), between a video stream decoder (e.g., an analog or digital video decompression unit) and a video display unit (e.g., a ruggedized flat panel display of a field video communications unit), or between some other standard (e.g., commercial off-the-shelf) video equipment and/or software. Such interoperability can provide benefits with respect to cost, logistical complexity, reliability, or other benefits when introducing the computing device 600 into existing devices or systems.

IV. Example Methods

Figure 7:
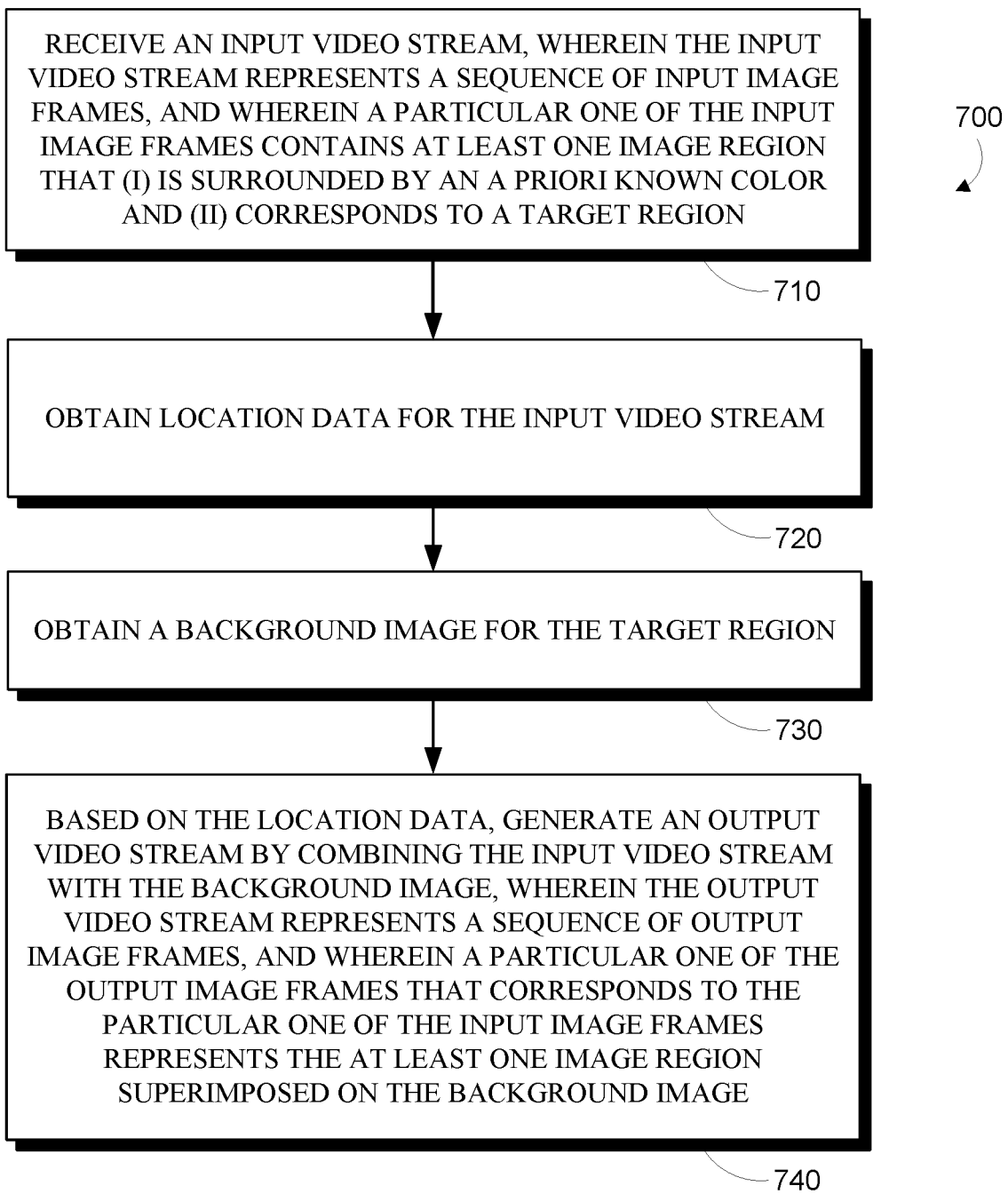
FIG. 7 is a flowchart depicting an example method.

FIG. 7 is a flowchart of a method 700 for generating a full-frame video stream from a restricted-bandwidth video stream (e.g., received via a satellite radio link or other limited-bandwidth link) and geographic information therefor. The method 700 includes receiving an input video stream (710). The input video stream represents a sequence of input image frames, and a particular one of the input image frames contains at least one image region that (i) is surrounded by an a priori known color and (ii) corresponds to a target region (e.g., a region being imaged by an unmanned aerial vehicle). The method 700 additionally includes obtaining location data for the input video stream (720). The method 700 additionally includes obtaining a background image for the target region (730). The background image could be obtained from a database of terrain images (e.g., a database of historical satellite images) and/or may be obtained from a camera (e.g., a camera of a UAV that is also being used to generate the received video stream). The method 700 additionally includes, based on the location data, generating an output video stream by combining the input video stream with the background image (740). The output video stream represents a sequence of output image frames, and a particular one of the output image frames that corresponds to the particular one of the input image frames represents the at least one image region superimposed on the background image.

The method 700 may include additional or alternative steps or features. For example, combining the input video stream with the background image could include: (i) based on the particular one of the input image frames, determining an extent of the at least one image region; and (ii) based on the determined extent of the at least one image region, extracting the at least one image region from the particular one of the input image frames. In another example, combining the input video stream with the background image could include superimposing the particular one of the input image frames onto the background image while treating pixels of the particular one of the input image frames that are the a priori known color as transparent.

In some examples, obtaining the background image can include, based on the location data, processing an image of the target region such that the background image represents the target region in a manner that corresponds to a perspective of a camera used to generate the input video stream. For example, processing the image of the target region could include mapping the image of the target region onto a topographic model of the target region.

In some examples, the particular one of the input image frames represents at least two image regions that are each surrounded by the a priori known color, and the particular one of the output image frames that corresponds to the particular one of the input image frames represents the at least two image regions superimposed on the background image.

In some examples, receiving the input video stream includes receiving the input video stream via a communication link from a remote system, and obtaining the background image for the target region includes receiving the background image via the communication link from the remote system prior to receiving the input video stream from the remote system.

In some examples, combining the input video stream with the background image includes applying a generic video decoder (e.g., an off-the-shelf hardware decoder) to the input video stream. In such examples, the method 700 could additionally include: (a) operating a camera to obtain a plurality of images of the target region; (b) determining one or more regions of interest within each of the plurality of images of the target region; (c) for each given image of the plurality of images, setting portions that are not within the one or more regions of interest within the given image to the a priori known color; and (d) after setting the portions to the a priori known color, applying a generic video encoder to the plurality of images of the target region to generate the input video stream.

V. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A method comprising:
   receiving an input video stream, wherein the input video stream represents a sequence of input image frames, and wherein a particular one of the input image frames contains at least one image region that (i) is surrounded by an a priori known color and (ii) corresponds to a target region;
   obtaining location data for the input video stream;
   obtaining a background image for the target region; and
   based on the location data, generating an output video stream by combining the input video stream with the background image, wherein the output video stream represents a sequence of output image frames, and wherein a particular one of the output image frames that corresponds to the particular one of the input image frames represents the at least one image region superimposed on the background image.

2. The method of claim 1, wherein combining the input video stream with the background image comprises:
   based on the particular one of the input image frames, determining an extent of the at least one image region; and
   based on the determined extent of the at least one image region, extracting the at least one image region from the particular one of the input image frames.

3. The method of claim 1, wherein combining the input video stream with the background image comprises superimposing the particular one of the input image frames onto the background image while treating pixels of the particular one of the input image frames that are the a priori known color as transparent.

4. The method of claim 1, wherein obtaining the background image comprises, based on the location data, processing an image of the target region such that the background image represents the target region in a manner that corresponds to a perspective of a camera used to generate the input video stream.

5. The method of claim 4, wherein processing the image of the target region comprises mapping the image of the target region onto a topographic model of the target region.

6. The method of claim 1, wherein the particular one of the input image frames represents at least two image regions that are each surrounded by the a priori known color, and wherein the particular one of the output image frames that corresponds to the particular one of the input image frames represents the at least two image regions superimposed on the background image.

7. The method of claim 1, wherein receiving the input video stream comprises receiving the input video stream via a communication link from a remote system, and wherein obtaining the background image for the target region comprises receiving the background image via the communication link from the remote system prior to receiving the input video stream from the remote system.

8. The method of claim 1, wherein combining the input video stream with the background image comprises applying a generic video decoder to the input video stream.

9. The method of claim 8, further comprising:
operating a camera to obtain a plurality of images of the target region;
determining one or more regions of interest within each of the plurality of images of the target region;
for each given image of the plurality of images, setting portions that are not within the one or more regions of interest within the given image to the a priori known color; and
after setting the portions to the a priori known color, applying a generic video encoder to the plurality of images of the target region to generate the input video stream.

10. A system comprising:
one or more processors; and
a non-transitory computer readable medium having stored thereon instructions executable by the one or more processors to perform functions comprising:
receiving an input video stream, wherein the input video stream represents a sequence of input image frames, and wherein a particular one of the input image frames contains at least one image region that (i) is surrounded by an a priori known color and (ii) corresponds to a target region;
obtaining location data for the input video stream;
obtaining a background image for the target region; and
based on the location data, generating an output video stream by combining the input video stream with the background image, wherein the output video stream represents a sequence of output image frames, and wherein a particular one of the output image frames that corresponds to the particular one of the input image frames represents the at least one image region superimposed on the background image.

11. The system of claim 10, wherein obtaining the background image comprises, based on the location data, processing an image of the target region such that the background image represents the target region in a manner that corresponds to a perspective of a camera used to generate the input video stream.

12. The system of claim 11, wherein processing the image of the target region comprises mapping the image of the target region onto a topographic model of the target region.

13. The system of claim 10, wherein the particular one of the input image frames represents at least two image regions that are each surrounded by the a priori known color, and wherein the particular one of the output image frames that corresponds to the particular one of the input image frames represents the at least two image regions superimposed on the background image.

14. The system of claim 10, wherein receiving the input video stream comprises receiving the input video stream via a communication link from a remote system, and wherein obtaining the background image for the target region comprises receiving the background image via the communication link from the remote system prior to receiving the input video stream from the remote system.

15. The system of claim 10, wherein combining the input video stream with the background image comprises applying a generic video decoder to the input video stream.

16. A non-transitory computer readable medium having stored thereon instructions executable by one or more processors to cause a computing system to perform functions comprising:
receiving an input video stream, wherein the input video stream represents a sequence of input image frames, and wherein a particular one of the input image frames contains at least one image region that (i) is surrounded by an a priori known color and (ii) corresponds to a target region;
obtaining location data for the input video stream;
obtaining a background image for the target region; and
based on the location data, generating an output video stream by combining the input video stream with the background image, wherein the output video stream represents a sequence of output image frames, and wherein a particular one of the output image frames that corresponds to the particular one of the input image frames represents the at least one image region superimposed on the background image.

17. The non-transitory computer readable medium of claim 16, wherein obtaining the background image comprises, based on the location data, processing an image of the target region such that the background image represents the target region in a manner that corresponds to a perspective of a camera used to generate the input video stream.

18. The non-transitory computer readable medium of claim 17, wherein processing the image of the target region comprises mapping the image of the target region onto a topographic model of the target region.

19. The non-transitory computer readable medium of claim 16, wherein the particular one of the input image frames represents at least two image regions that are each surrounded by the a priori known color, and wherein the particular one of the output image frames that corresponds to the particular one of the input image frames represents the at least two image regions superimposed on the background image.

20. The non-transitory computer readable medium of claim 16, wherein combining the input video stream with the background image comprises applying a generic video decoder to the input video stream.

* * * * *